United States Patent [19]

Gregg

[11] Patent Number: 5,563,867
[45] Date of Patent: Oct. 8, 1996

[54] OPTICAL TAPE DUPLICATOR

[75] Inventor: David P. Gregg, Culver City, Calif.

[73] Assignee: Discovision Associates, Irvine, Calif.

[21] Appl. No.: 269,309

[22] Filed: Jun. 30, 1994

[51] Int. Cl.⁶ .................................................. G11B 7/28
[52] U.S. Cl. ............................ 369/84; 369/85; 369/83; 360/15
[58] Field of Search ......................... 369/84, 83, 85, 369/93, 94, 96, 97, 53, 54, 58, 47, 48; 360/13, 15, 16, 17

[56] References Cited

U.S. PATENT DOCUMENTS

| | | |
|---|---|---|
| 1,250,894 | 12/1917 | Kately et al. |
| 1,381,840 | 6/1921 | Jeapes. |
| 1,591,466 | 7/1926 | Capstaff. |
| 1,725,944 | 8/1929 | Thompson. |
| 1,801,450 | 4/1931 | Owens. |
| 1,828,364 | 10/1931 | Garbutt. |
| 2,037,806 | 4/1936 | Little ........................................ 271/2.1 |
| 2,052,624 | 9/1936 | Harrison ........................................ 95/5 |
| 2,408,310 | 9/1946 | Hassler ........................................ 95/73 |
| 2,552,255 | 5/1951 | Capstaff ........................................ 95/75 |
| 2,569,793 | 10/1951 | Anderson .................................. 250/86 |
| 2,747,478 | 5/1956 | Capstaff et al. ............................. 95/75 |
| 2,849,298 | 8/1958 | Werberig .................................... 41/43 |
| 2,890,621 | 6/1959 | Suits ............................................ 88/24 |
| 2,983,250 | 5/1961 | Godfrey .................................. 118/401 |
| 3,054,339 | 9/1962 | Marcott ........................................ 95/75 |
| 3,057,275 | 10/1962 | Walkup et al. ............................. 95/1.7 |
| 3,120,163 | 2/1964 | Gittler ........................................ 95/75 |
| 3,148,600 | 9/1964 | Bain ............................................ 95/1.7 |
| 3,157,102 | 11/1964 | Pfaff ............................................ 95/75 |
| 3,161,120 | 12/1964 | Timares et al. ............................. 95/75 |
| 3,168,022 | 2/1965 | Limberger .................................. 95/1.7 |
| 3,169,465 | 2/1965 | Patterson .................................... 95/76 |
| 3,230,857 | 1/1966 | Ritzerfeld et al. .......................... 95/75 |
| 3,262,381 | 7/1966 | Zimmerman ................................ 95/75 |
| 3,308,731 | 3/1967 | Olden ........................................ 95/1.7 |
| 3,320,867 | 5/1967 | Miller ........................................ 95/75 |
| 3,437,336 | 4/1969 | Enke et al. ................................ 271/45 |
| 3,468,606 | 9/1969 | Wolf et al. ................................ 355/91 |
| 3,488,121 | 1/1970 | Dassonville ................................ 355/90 |
| 3,562,005 | 2/1971 | Angelo et al. ............................ 117/212 |
| 3,582,207 | 6/1971 | Johnson et al. ............................ 355/90 |
| 3,614,223 | 10/1971 | Ott ............................................ 355/30 |
| 3,644,039 | 2/1972 | Boyer ........................................ 355/85 |
| 3,644,040 | 2/1972 | Beispel .................................... 355/103 |
| 3,664,738 | 5/1972 | Cameron .................................... 355/87 |
| 3,669,720 | 6/1972 | Remer .................................... 117/93.31 |
| 3,689,991 | 9/1972 | Aird .......................................... 29/577 |

(List continued on next page.)

OTHER PUBLICATIONS

SPIE-The International Society for Optical Engineering, Carlin & Kay, Optical Data Storage, Feb. 9–14, 1992, San Jose, California, vol. 1663, pp. 324–335.

SPIE-Erasable Optical Tape Feasibility Study, Vogelgesang & Hartmann, 3M, Information & Imaging Technologies Sector, 1988, vol. 899, pp. 172–177.

University of Arizona, High Speed Optical Tape System, Milster & Williamson, Jun. 3, 1991, vol. 1, pp. 2–36 & Appendix.

Primary Examiner—Georgia Y. Epps
Assistant Examiner—Muhammad N. Edun
Attorney, Agent, or Firm—Ronald J. Clark; Robert T. Braun; Craig Burnett

[57] ABSTRACT

An optical tape duplicator is disclosed for making multiple copies of recorded optical tape by continuous contact recording. An information-bearing master tape held in intimate contact with an optical tape are passed through a recording zone exposed to a beam of radiant energy for recording information stored by the master tape to the optical tape. The master tape contains transmissive and non-transmissive portions that represent the information stored by the master tape. The optical tape is sensitive to the beam of radiant energy. The beam of radiant energy passes through the transmissive portions of the master tape while making contact with the optical tape in the recording zone, causing information stored by the master tape to be recorded by the optical tape as indicia where the optical tape was exposed to the beam of radiant energy.

9 Claims, 3 Drawing Sheets

U.S. PATENT DOCUMENTS

| | | | |
|---|---|---|---|
| 3,751,165 | 8/1973 | Inoue et al. | 355/108 |
| 3,817,618 | 6/1974 | Riley et al. | 355/100 |
| 3,853,400 | 12/1974 | Hosaka | 355/103 |
| 3,854,817 | 12/1974 | Erech et al. | 355/84 |
| 3,968,563 | 7/1976 | Hamlin | 29/591 |
| 3,998,544 | 12/1976 | Pass et al. | 355/40 |
| 4,056,321 | 11/1977 | Gensike et al. | 355/99 |
| 4,105,329 | 8/1978 | Carter et al. | 355/91 |
| 4,106,871 | 8/1978 | Roberts | 355/99 |
| 4,173,407 | 11/1979 | Kuehnle | 355/12 |
| 4,175,858 | 11/1979 | Meadows | 355/99 |
| 4,181,427 | 1/1980 | Rotter | 355/43 |
| 4,190,352 | 2/1980 | Bruning | 355/19 |
| 4,201,581 | 5/1980 | Thomas et al. | 430/396 |
| 4,324,484 | 4/1982 | Johnson | 355/5 |
| 4,416,540 | 11/1983 | Nicholson | 350/3.69 |
| 4,423,956 | 1/1984 | Gordon | 355/110 |
| 4,520,472 | 5/1985 | Reno | 369/112 |
| 4,567,585 | 1/1986 | Gelbart | 369/97 |
| 4,626,099 | 12/1986 | Zuelke et al. | 355/99 |
| 4,661,941 | 4/1987 | Bell et al. | 369/111 |
| 4,674,867 | 6/1987 | Kitai et al. | 355/78 |
| 4,743,091 | 5/1988 | Gelbart | 350/252 |
| 4,788,576 | 11/1988 | Saito et al. | 355/43 |
| 4,807,213 | 2/1989 | Chung et al. | 369/46 |
| 4,815,067 | 3/1989 | Webster et al. | 369/97 |
| 4,884,260 | 11/1989 | Bouldin et al. | 369/97 X |
| 5,077,724 | 12/1991 | Gregg | 369/258 |
| 5,081,617 | 1/1992 | Gelbart | 369/112 |
| 5,177,724 | 1/1993 | Gelbart | 369/44.16 |
| 5,215,808 | 6/1993 | Barnard | 428/194 |
| 5,239,528 | 8/1993 | Narahara et al. | 369/44.18 |

OPTICAL TAPE DUPLICATOR

BACKGROUND OF THE INVENTION

This invention relates to tape recording, and more particularly to optical tape recording. Currently there are two main types of optical tape recorders. The two main types of optical recorders differ in how an optical recording head moves across the optical tape. The first type of optical recording head is a rotary head that scans across the tape in a helical scan pattern. The rotary head usually includes at least two recording elements, so that each revolution of the rotary head records multiple tracks on the tape. Examples of rotary optical recording heads are disclosed in U.S. Pat. Nos. 5,239,528, 4,815,067, 4,807,213, and 4,661,941.

The second type of optical tape recorder employs an optical recording head that moves across the tape in a linear motion. The linear motion of the recording head is transverse to the motion of the tape itself. Linear recording heads use either a single recording element, or an array of recording elements. Typical linear optical recording heads are disclosed in U.S. Pat. Nos. 5,177,724 and 4,567,585.

The two existing types of optical tape recorders have generally performed adequately. However, both types are relatively slow at recording optical tape. Their slow speed of recording is one barrier to optical tape replacing magnetic tape as the medium of choice for recording and playing movies and other images. (Another barrier is the lack of a suitable optical tape cartridge, the subject of a copending patent application entitled, "OPTICAL TAPE CARTRIDGE," by David Paul Gregg.) There is therefore a need for an optical tape duplicator that can record optical tapes at the speed and at the cost required by the consumer market.

These and other features of the present invention will become readily appreciated from the following detailed description when considered in conjunction with the accompanying drawings.

DETAILED DESCRIPTION OF THE PREFERRED EMBODIMENT

Details of illustrative embodiments of the invention are disclosed in this section. However, it should be understood that these embodiments merely exemplify the present invention which may take forms different from the specific illustrative embodiments disclosed. Therefore, specific structural and functional details are not necessarily to be interpreted as limiting, but as a basis for the claims. It should also be understood that components illustrated in this section are well-known to those skilled in the art. Therefore, some of the details and refinements associated with these components are not illustrated, but should be understood to be present. For example, such details and refinements would include, but are not limited to, frames, motors, capstans, rollers, tension controls, electronics, etc.

Figure 1:
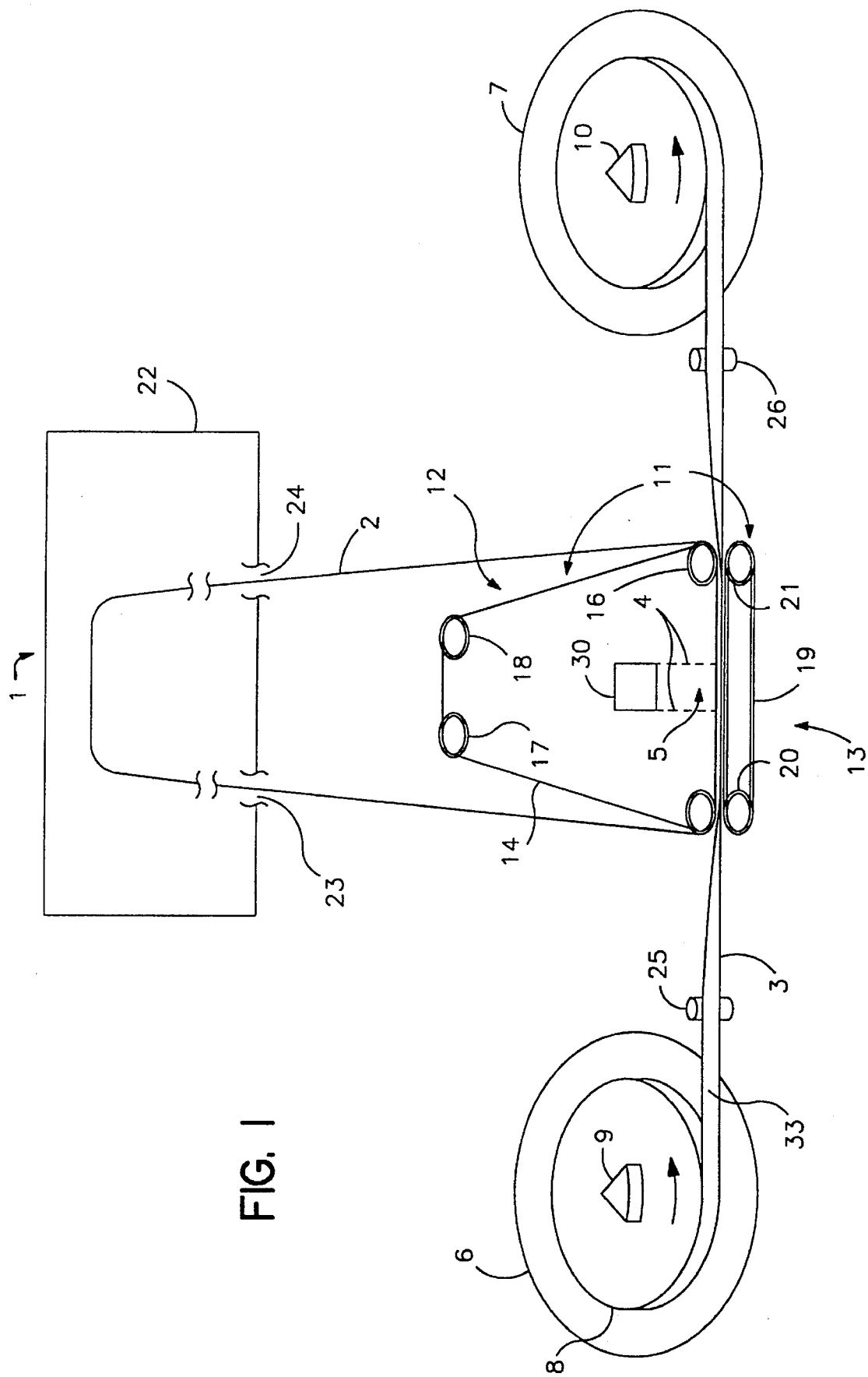
FIG. 1 is a diagram of an optical tape duplicator.
Figure 2:
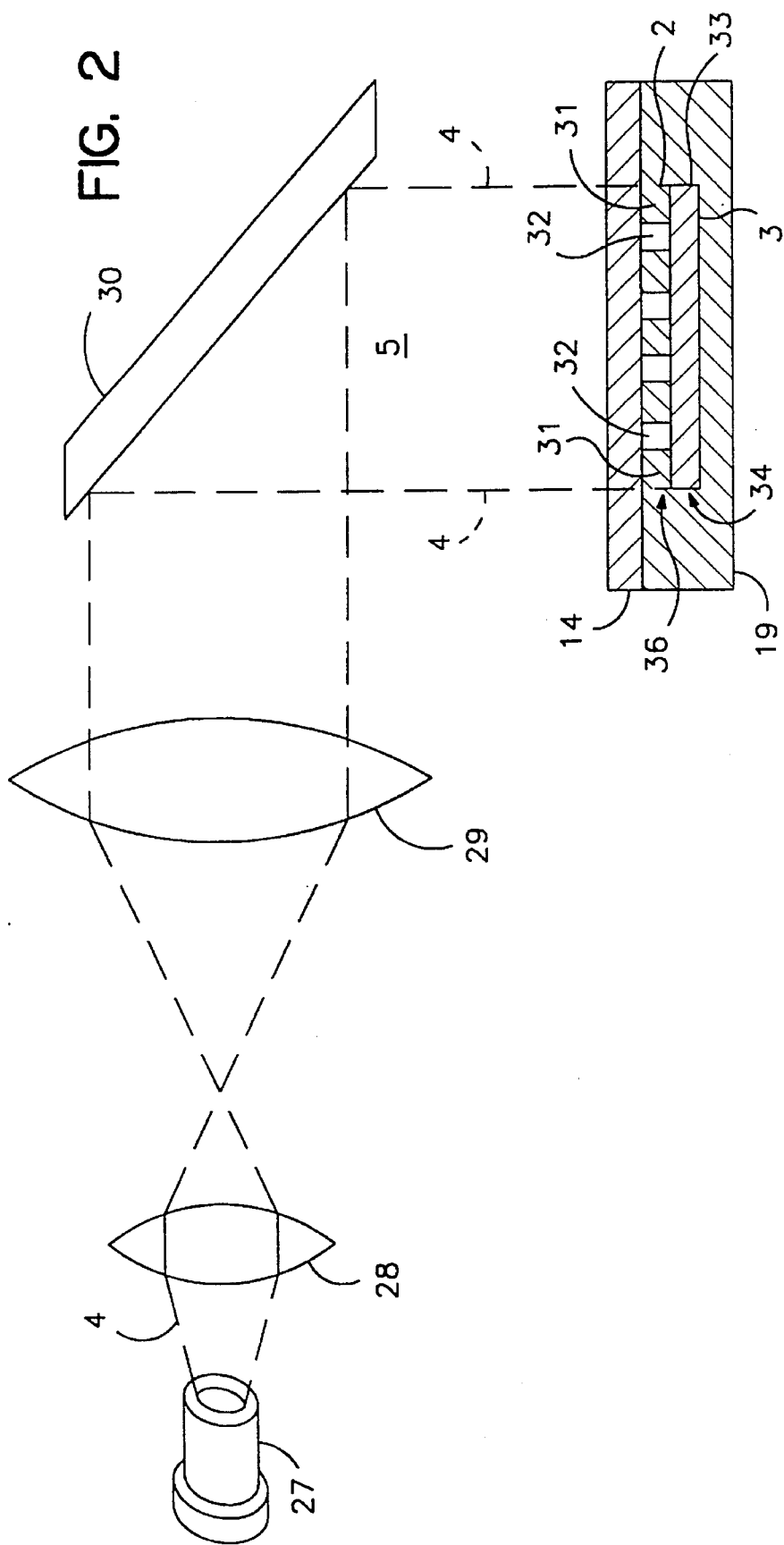
FIG. 2 is a diagram of a path taken by a beam of radiant energy during the operation of the optical tape duplicator of FIG. 1.
Figure 3:
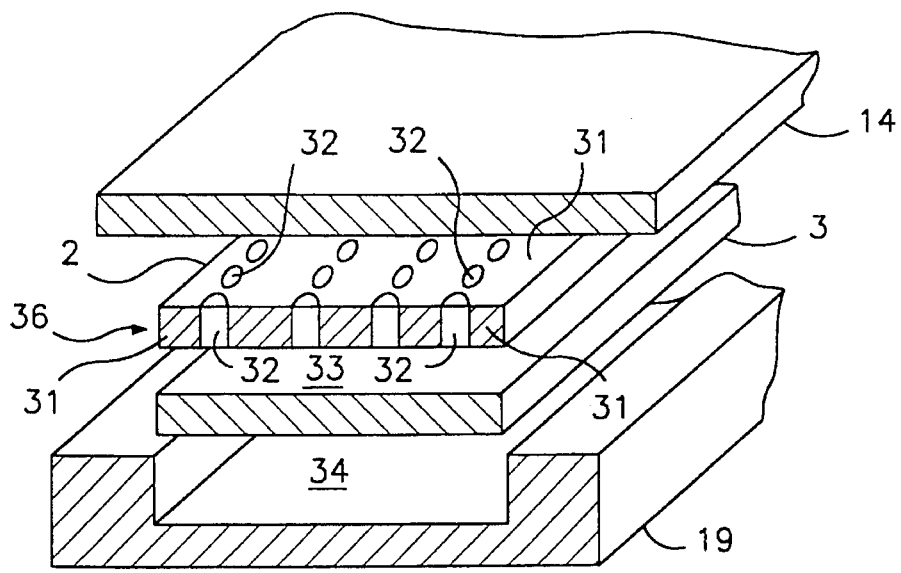
FIG. 3 is an exploded view of the transparent belt, master tape, optical tape and support belt configuration of FIG. 2.
Figure 4:
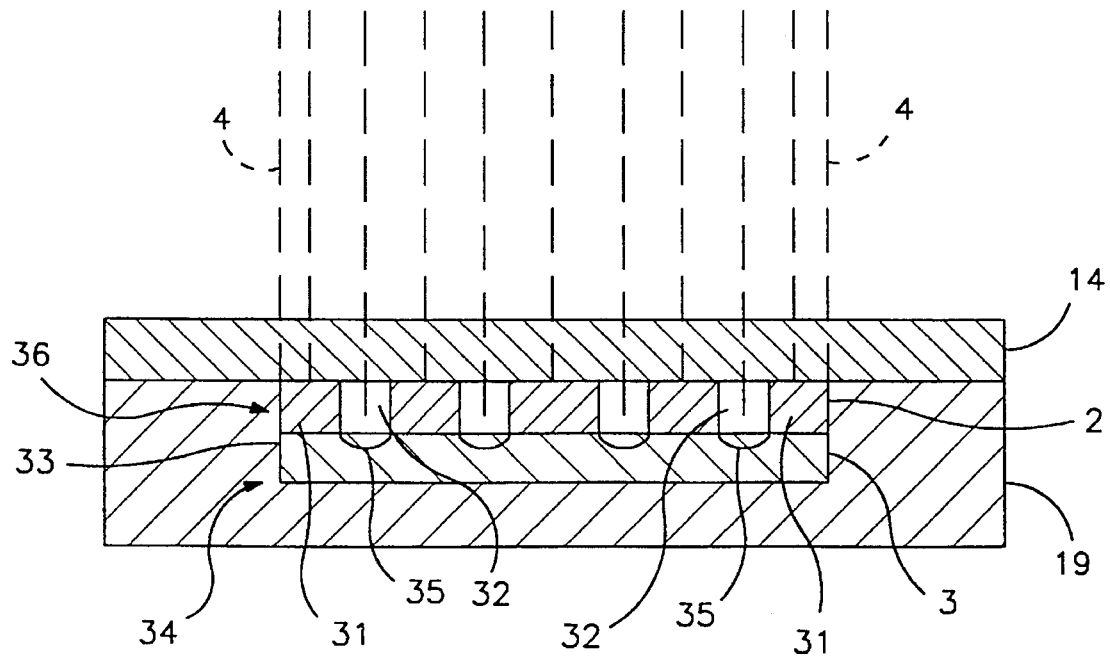
FIG. 4 is a diagram of the optical tape shown in FIGS. 1, 2 and 3 after the optical tape has been recorded by the optical tape duplicator of FIG. 1.

Referring now to FIG. 1, there is shown a diagram of a preferred embodiment of an optical tape duplicator 1. Referring now to FIGS. 1, 2, 3 and 4, duplicator 1 duplicates information 36, contained on an information-bearing master tape 2, as indicia 35 in an optical tape 3. In brief, duplicator 1 includes an information-bearing endless master tape 2 which contains prerecorded information 36. Optical tape 3 includes recording surface 33 that is sensitive to beam of radiant energy 4. Master tape 2 makes intimate contact with optical tape 3. While in intimate contact, master tape 2 and optical tape 3 are simultaneously passed through a recording zone 5 and exposed to beam of radiant energy 4. Exposure of master tape 2 and optical tape 3 to beam of radiant energy 4 causes in formation 36 stored by master tape 2 to be recorded in recording surface 33 of optical tape 3 as indicia 35. This recording process is repeated until the supply of optical tape 3 is exhausted.

Optical tape 3 is dispensed from supply platter 6 before recording and received by take-up platter 7 after recording. Optical tape 3 is wound around spindle 9 attached to the center of supply platter 6. Similarly, recorded optical tape 3 is wound around spindle 10 attached to the center of take-up platter 7 after recording. The configuration of optical tape 3 with platter 6 or 7 is known in the recording industry as a "pancake" because of its shape. Both supply platter 6 and take-up platter 7 are rotatably mounted to a frame (not shown).

Preferably both platters 6 and 7 are mounted in the frame so that tape 3 is dispensed horizontally. Alternatively, platters 6 and 7 can be replaced by reels (not shown) with side supports that allow the reels to be mounted vertically in the frame. However, horizontal platters 6 and 7 are preferred to vertical reels because horizontal platters 6 and 7 distribute the weight of a fully wound optical tape 3 more uniformly than would vertical reels, and are themselves easier for the frame to support.

With continued reference to FIG. 1, duplicator 1 includes clamping device 11 for holding master tape 2 and optical tape 3 in intimate contact with each other while being passed through recording zone 5. Clamping device 11 comprises upper clamping mechanism 12 and lower clamping mechanism 13. Upper clamping mechanism 12 comprises transparent belt 14 disposed about rollers 15, 16, 17 and 18, and generally forms the shape of a four sided polygon. Rollers 15, 16, 17 and 18 are rotatably mounted in the same vertical plane with each other. Rollers 15, 16, 17 and 18 each have an axis of rotation perpendicular to the vertical plane in which they are mounted. Rollers 15 and 16 are laterally displaced from each other in the horizontal direction and rollers 17 and 18 are generally positioned above rollers 15 and 16, and are also laterally displaced from each other in the horizontal direction.

Master tape 2 is partially disposed about the lower portion of upper clamping device 11. Specifically, master tape 2 comes into intimate contact with transparent belt 14 at a point intermediate rollers 17 and 15. While maintaining intimate contact with transparent belt 14, master tape 2 follows transparent belt 14 downward around roller 15, along the bottom surface of upper clamping mechanism 12 formed by transparent belt 14, and upward around roller 16 until master tape 2 breaks intimate contact with transparent belt 14 at a point intermediate rollers 16 and 18.

Lower clamping mechanism 13 is comprised of support belt 19 disposed about rollers 20 and 21. Rollers 20 and 21 are laterally displaced from each other in the horizontal direction and are also rotatably mounted in the same vertical plane that rollers 15, 16, 17 and 18 are mounted. Rollers 20 and 21 also have an axis of rotation perpendicular to the vertical plane in which they are mounted. Optical tape 3 comes into intimate contact with support belt 19 at a point generally positioned above roller 20. Optical tape 3 maintains intimate contact with the upper surface of lower clamping mechanism 13 formed by support belt 19 until optical tape 3 breaks intimate contact with support belt 19 at a position generally above roller 21. Rollers 20 and 21 are positioned in close proximity below rollers 15 and 16, respectively, such that support belt 19 and transparent belt 14 apply sufficient clamping pressure to hold master tape 2 and optical tape 3 in intimate contact with each other while passing through recording zone 5 during the recording process.

Preferably, lower clamping mechanism 13 can move in the vertical direction when duplicator 1 is not recording to allow easy installation and removal of master tape 2 and optical tape 3.

As previously stated, master tape 2 is an endless tape partially disposed about the lower portion of upper clamping mechanism 12. The bulk of endless master tape 2 is stored in loop chamber 22. In general, loop chamber 22 is an enclosed rectangular box with two tape openings 23 and 24. Master tape 2 exits loop chamber 22 at tape opening 23, wraps around the lower portion of upper clamping mechanism 12, and reenters loop chamber 22 at tape opening 24. The width of the inside of loop chamber 22 is slightly wider than the width of master tape 2. Loop chamber 22 must be large enough to allow the bulk of master tape 2 to freely flutter about the inside of loop chamber 22 during operation. This helps prevent master tape 2 from becoming kinked, bent or otherwise damaged during operation. Allowing for flutter in loop chamber 22 also allows master tape 2 to quickly and freely exit and enter loop chamber 22 during operation. A continuous vacuum can be created inside loop chamber 22 to help draw master tape 2 into loop chamber 22 at tape opening 24 as master tape 2 leaves clamping device 11.

It should be recognized that any loop chamber generally known to those skilled in the art can be used, including the loop chamber disclosed in U.S. Pat. No. 3,854,817, which is hereby incorporated by reference.

Capstan 25 is rotatably mounted to the frame at a point intermediate supply platter 6 and clamping device 11. The axis of rotation of capstan 25 is in the vertical direction. Capstan 25 is mounted in substantially the same vertical plane as clamping device 11. Capstan 25 holds optical tape 3 in proper alignment for feeding into clamping device 11 after optical tape 3 unwinds off of supply platter 6. Optical tape 3 experiences a 90 degree twist between capstan 25 and clamping device 11 because clamping device 11 forces recording surface 33 of optical tape 3 to face upward in a horizontal plane when making intimate contact with master tape 2 for recording.

Similarly, capstan 26 is rotatably mounted to the frame at a point intermediate clamping device 11 and take-up platter 7. The axis of rotation of capstan 26 is in the vertical direction. Capstan 26 is mounted in substantially the same vertical plane as clamping device 11. Capstan 26 holds optical tape 3 in proper alignment when leaving clamping device 11 and before optical tape 3 is wound onto take-up platter 7. Optical tape 3 experiences a 90 degree twist between clamping device 11 and capstan 26 because optical tape 3 exits clamping device 11 lying in a horizontal plane and capstan 26 forces the width of optical tape 3 to be positioned in a vertical plane for winding onto take-up platter 7.

Referring now to FIGS. 1, 2, 3 and 4, radiation source 27 emits beam of radiant energy 4 through magnification lens 28 forming an enlarged image of beam of radiant energy 4 that is collimated by collimation lens 29 and reflected by square mirror 30. Square mirror 30 is positioned at a 45 degree angle such that beam of radiant energy 4 is reflected downward through transparent belt 14 and master tape 2, and impinges optical tape 3 such that information 36 stored by master tape 2 is recorded as indicia 35 in optical tape 3. Collimation lens 29 and square mirror 30 are of a size sufficient to ensure that reflected beam of radiant energy 4 covers the recording width of optical tape 3 during the recording process. Radiation source 27 can be any source of radiation suitable for recording optical discs or optical tapes, including, but not limited to, laser diodes, laser beams, and light sources.

With continued reference to FIGS. 1, 2, 3 and 4, transparent belt 14 is made of a suitably transparent material so that beam of radiant energy 4 passes through both transparent belt 14 and master tape 2 to form indicia 35 in optical tape 3. Transparent belt 14 should be made of a material not easily damaged or scratched, and should be relatively free of blemishes that might interfere with the recording process. Support belt 19 need not be transparent, but may be made of any material suitable for the purpose.

Optical tape 3 can be any optical tape that is suitable for making recordings by being exposed to beam of radiant energy 4. The method of recording optical tape 3 is preferably thermal or ablative. Suitable optical tape 3 is sold by Imperial Chemical Industry (ICI) of the United Kingdom. A description of ICI optical tape is found in U.S. Pat. No. 5,215,808, and in U.S. Pat. No. 5,077,724 by Gregg, both of which are hereby incorporated by reference.

Alternatively, the recording method can be magneto-optical, with the addition of suitable magnets or electromagnets (not shown) to duplicator 1. An example of magneto-optical tape is disclosed in U.S. Pat. No. 5,215,808, which is hereby incorporated by reference.

In operation, transparent belt 14 and support belt 19 hold master tape 2 firmly in intimate contact with optical tape 3 in recording zone 5. A motor (not shown) rotates take-up platter 7 in a counter-clockwise direction such that optical tape 3 is unwound off of supply platter 6 and is wound onto take-up platter 7. Optical tape 3 unwinds off supply platter 6, with the width of optical tape 3 in a vertical plane, and makes contact with capstan 25 which freely rotates due to the movement of optical tape 3. Clamping device 11 causes optical tape 3 to experience a 90 degree twist as it rolls off of capstan 26 and into clamping device 11 by holding master tape 2 and optical tape 3 in intimate contact with each other in a horizontal plane.

Master tape 2, transparent belt 14 and support belt 19 all freely rotate as optical tape 3 is pulled through clamping device 11. Support belt 19 freely rotates about rollers 20 and 21; transparent belt 14 freely rotates about rollers 15, 16, 17 and 18; and master tape 2 freely rotates about the lower portion of upper clamping mechanism 12 and into and out of loop chamber 22.

Radiation source 27 emits beam of radiant energy 4 through magnification lens 28 forming an enlarged image of beam of radiant energy 4 that is collimated by collimation lens 29 and is reflected by square mirror 30. Square mirror 30 is portioned at a 45 degree angle and reflects beam of radiant energy 4 toward master tape 2 and optical tape 3.

Beam of radiant energy 4 passes through transparent belt 14, transmissive portion 32 of master tape 2, and impinges optical tape 3 such that information stored by master tape 2 is recorded by optical tape 3 as indicia 35. Specifically, beam of radiant energy 4 passes through transmissive portions 32 of master tape 2 creating indicia 35 in optical tape 3 where optical tape 3 is exposed to beam of radiant energy 4. The maximum speed at which optical tape 3 can pass through recording zone 5 and record information 36 is directly proportional to the intensity at which beam of radiant energy 4 is emitted from radiation source 27.

Optical tape 3 experiences a 90 degree twist as it leaves clamping device 11 after being recorded and makes contact with capstan 26. Optical tape 3 causes capstan 26 to freely roll as optical tape 3 moves along capstan 26 and winds around take-up platter 7. The recording process is repeated until the supply of optical tape 3 is exhausted.

Master tape 2 can be made of any thin flexible material that is also resilient to longitudinal stretching. Master tape 2 is essentially a template having transmissive portions 32 and non-transmissive portions 31 that represent information 36. Transmissive portions 32 are transmissive to beam of radiant energy 4 while non-transmissive portions 31 are not transmissive to beam of radiant energy 4. One advantage of using master tape 2 to record optical tape 3 is that master tape 2 can be easily adapted for making optical tape recordings that require a specific recording format. For example, by installing the appropriate master tape 2, an optical tape 3 can be recorded in a format that is capable of being read by an optical tape player that uses a rotary playing head. By merely changing master tapes 2, an optical tape 3 can be recorded in a format that is capable of being read by an optical tape player that uses a linear playing head.

Lateral registration of master tape 2 and optical tape 3 must be maintained while passing through recording zone 5 during the recording process. By way of example, lateral registration can be achieved by providing recess 34 in the surface of support belt 19 for receiving both optical tape 3 and master tape 2. Optical tape 3 sits in the bottom of recess 34, thus making intimate contact with support belt 19. Master tape 2 sits in recess 34 and on top of optical tape 3. Recess 34 should have a depth such that the inside surface of master tape 2 sits flush with the outside surface of support belt 19. Recess 34 should have a width capable of maintaining master tape 2 and optical tape 3 in substantially perfect lateral registry while at the same time being capable of allowing master tape 2 and optical tape 3 to freely roll off of support belt 19 when leaving clamping device 11. Transparent belt 14 has substantially the same width as support belt 19 and holds master tape 2 and optical tape 3 snugly in recess 34. It should be recognized that any other method of maintaining lateral registry known to those skilled in the art can be used.

Beam of radiant energy 4 has been described as passing through transparent belt 14. Alternatively, transparent belt 14 and rollers 17 and 18 can be removed, and rollers 15 and 16 can be replaced with rollers suitable for holding master tape 2 in intimate contact with optical tape 3 during the recording process. This allows beam of radiant energy 4 to directly impinge master tape 2 when causing information 36 to be recorded by optical tape 3.

Yet another alternative is to replace transparent belt 14 and rollers 15, 16, 17 and 18 with two belt and roller configurations similar to support belt 19 and rollers 20 and 21. The belt configurations are placed on both sides of recording zone 5 while holding master tape 2 in intimate contact with optical tape 3. Again, this allows beam of radiant energy 4 to directly impinge master tape 2 when recording optical tape 3.

While loop chamber 22 is depicted in FIG. 1 as appearing above clamping device 11, it should be understood that loop chamber 22 can be placed in any position that allows master tape 2 to freely exit and enter loop chamber 22, while at the same time still allowing master tape 2 to be brought into intimate contact with optical tape 3 in clamping device 11 during the recording process. This includes, but is not limited to, placing loop chamber 22 under clamping device 11 and using a series of rollers, capstans and guides to feed master tape 2 into and out of loop chamber 22.

While master tape 2 is described as being an endless tape, an alternate form of the invention is to use a noncontinuous master tape that is dispensed from a master tape supply reel and received by a master tape take-up reel.

In an alternate form of the invention, square mirror 30 is replaced with a prism for reflecting beam of radiant energy 4. In yet another form of the invention, square mirror 30 is removed and radiation source 27, magnification lens 28 and collimation lens 29 are positioned such that beam of radiant energy 4 is emitted directly into recording zone 5 without being reflected.

Lastly, in addition to the description already provided, radiation source 27 can also be either a monolithic laser diode array, disclosed by way of example in U.S. Pat. No. 4,520,472, hereby incorporated by reference; or an array of discrete laser diodes, disclosed by way of example in U.S. Pat. No. 4,743,091, also hereby incorporated by reference. Depending on the dimensions of either laser diode array used, magnification lens 28 and collimation lens 29 may or may not be required to achieve a beam sufficient to cover the recording width of optical tape 3.

A detailed description of the invention has been provided in compliance with the patent laws. However, such detailed description is not intended to limit the scope of the features or principles of the claimed invention.

What is claimed is:

1. An optical tape duplicator, comprising:
   means for emitting a beam of radiant energy into a recording zone;
   a master tape having first portions being transmissive to said beam of radiant energy and having second portions being non-transmissive to said beam of radiant energy;
   an optical tape that is sensitive to said beam of radiant energy; and
   means for holding said master tape in intimate contact with said optical tape in said recording zone such that said beam of radiant energy passes through said transmissive first portions of said master tape causing said optical tape to be recorded by creating indicia in said optical tape where said optical tape was exposed to said beam of radiant energy.

2. The optical tape duplicator of claim 1, further comprising:
   means for moving said master tape held in intimate contact with said optical tape through said recording zone as said optical tape is recorded.

3. The optical tape duplicator of claim 1, further comprising:
   means for moving said master tape held in intimate contact with said optical tape through said recording zone at a recording speed that is directly proportional to the intensity of said beam of radiant energy.

4. The optical tape duplicator of claim 1, 2 or 3, wherein:

said master tape is an endless master tape.

5. A method for duplicating optical tape, comprising the steps of:

Emitting a beam of radiant energy into a recording zone;

holding a master tape, having first portions being transmissive to said beam of radiant energy and having second portions being non-transmissive to said beam of radiant energy, in intimate contact with an optical tape having a recording surface sensitive to said beam of radiant energy;

moving said master tape and optical tape held in intimate contact with each other through said recording zone; and exposing said master tape and said optical tape to said beam of radiant energy while moving through said recording zone such that said beam of radiant energy passes through said transmissive first portions of said master tape causing said optical tape to be recorded by creating indicia in said optical tape where said optical tape was exposed to said beam of radiant energy.

6. The method for duplicating optical tape in claim 5, wherein the step of moving said master tape and optical tape held in intimate contact with each other through said recording zone includes:

moving said master tape and said optical tape through said recording zone at a recording speed that is directly proportional to the intensity of said beam of radiant energy.

7. An optical tape duplicator comprising:

a radiation source for emitting a beam of radiant energy into a recording zone;

an optical tape that is sensitive to said beam of radiant energy;

a master tape having first portions being transmissive to said beam of radiant energy and having second portions being non-transmissive to said beam of radiant energy;

a supply platter for dispensing said optical tape;

a take-up platter for receiving said optical tape;

a first clamping mechanism;

a second clamping mechanism;

said first clamping mechanism making intimate contact with said master tape in said recording zone;

said master tape making intimate contact with said optical tape in said recording zone;

said optical tape making intimate contact with said second clamping mechanism in said recording zone;

means for rotating said take-up platter such that said master tape held in intimate contact with said optical tape by said first clamping mechanism and said second clamping mechanism, move through said recording zone allowing said beam of radiant energy to pass through said transmissive first portions of said master tape causing said optical tape to be recorded by creating indicia in said optical tape where said optical tape was exposed to said beam of radiant energy.

8. The optical tape duplicator of claim 7, wherein:

said master tape is an endless master tape.

9. The optical tape duplicator of claim 7, wherein:

said first clamping mechanism includes a transparent belt disposed about a first set of rollers; and said second clamping mechanism includes a support belt disposed about a second set or rollers.

* * * * *

UNITED STATES PATENT AND TRADEMARK OFFICE
CERTIFICATE OF CORRECTION

PATENT NO. : 5,563,867
DATED : October 8, 1996
INVENTOR(S) : David P. Gregg

It is certified that error appears in the above-identified patent and that said Letters Patent is hereby corrected as shown below:

Column 6, line 12, delete *"teed"* after *"to"* and before *"master"* insert - -*feed*- -.

Signed and Sealed this

Fourteenth Day of September, 1999

Attest:

Q. TODD DICKINSON

*Attesting Officer*   Acting Commissioner of Patents and Trademarks